May 6, 1969 P. E. AEGIDIUS 3,442,623
METHOD OF DETERMINING THE FAT CONTENT OF MILK
AND RELATED PRODUCTS
Filed Sept. 7, 1967 Sheet 1 of 2

INVENTOR.
Poul E. Aegidius
BY
Watson, Cole, Grindle & Watson
ATTORNEYS

United States Patent Office 3,442,623
Patented May 6, 1969

3,442,623
METHOD OF DETERMINING THE FAT CONTENT OF MILK AND RELATED PRODUCTS
Poul E. Aegidius, Hillerod, Denmark, assignor to A/S N. Foss Electric, Hillerod, Denmark
Continuation-in-part of application Ser. No. 301,548, Aug. 12, 1963. This application Sept. 7, 1967, Ser. No. 685,989
Claims priority, application Denmark, Aug. 14, 1962, 3,562/62
Int. Cl. G01n 33/06
U.S. Cl. 23—231       15 Claims

ABSTRACT OF THE DISCLOSURE

A method for colorimetrically determining the fat content of milk by first adding a protein chelating agent to a milk sample and then homogenizing the sample at a constant pressure. The homogenized sample is placed in a cuvette of a colorimeter, the distance between the cuvette and the photoelectric cell being such that a curve representing the transmission of light through the cuvette as a function of the homogenizing pressure shows a distinct minimum at the homogenizing pressure. The light transmission reading may be compared with the curve for samples of known fat content.

---

Figure 1:
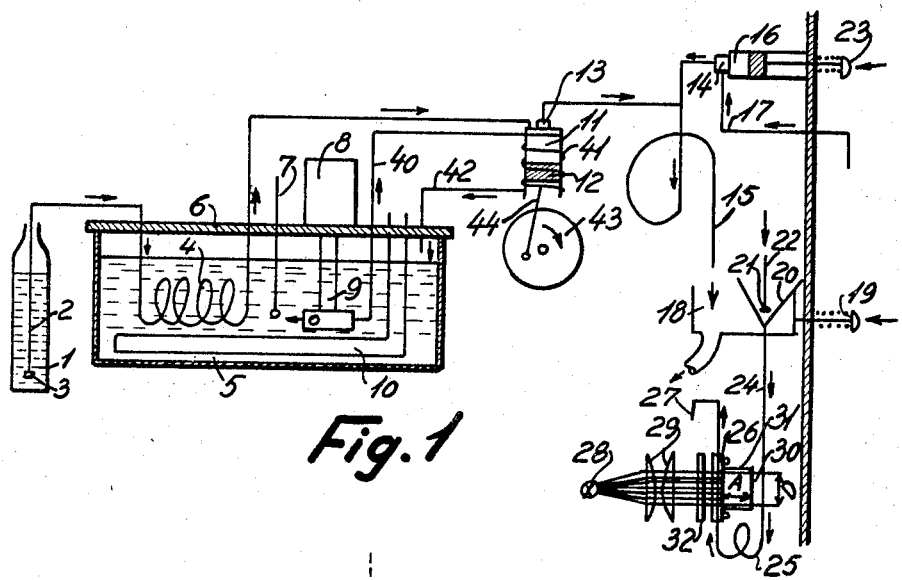

This application is a continuation-in-part application of my copending application Ser. No. 301,548, filed Aug. 12, 1963, and now abandoned.

This invention relates to an improved method and apparatus for determining the fat content of milk and related products colorimetrically.

Colorimetric methods for determining the fat content of milk have been known and used for some time. Improvements have been made in the method; however, colorimetric methods of testing milk even with these improved techniques have frequently been found not to produce accurate results. A number of variables have been found in the milk content which affect the light transmission through the milk sample being tested. In addition to the fat content both carbohydrates and proteins have been found to affect the test results. Techniques have been discovered for eliminating these latter variables. The effect of the presence of carbohydrates on light transmission has been eliminated by substantial dilution of the milk sample with water. By the further addition of a chelating agent the proteins present in the milk sample may be chelated thus avoiding the possibility of a protein colloid dispersion adversely affecting light transmission in the colorimeter. A convenient chelating agent for proteins is Versene, a trade name of Dow Chemical Company for a disodium salt of ethylenediaminetetraacetic acid.

The size of the fat globules themselves has a direct affect on light transmission, and to reduce the influence of fat globule size, the milk sample is homogenized before light transmission readings are taken on the sample in the colorimeter. Though homogenization does break up the large fat globules into smaller globules, there is still unavoidable wide variation in globule size in the homogenized product. The size of the fat globules influences both the light absorption of the product and the dispersion of the light, and thereby the proportion of the light which impinges on the photoelectric cell of the colorimeter will be affected, thus giving a false determination as to the fat percentage in the milk sample.

Attempts have been made to overcome this difficulty by utilizing the fact that the influence of the size of the fat globules in light transmission is different depending upon whether the photoelectric cell is located at a greater or smaller distance from the cuvette containing the milk sample. Light passage through the cuvette increases with increasing homogenizing pressure, and the increase is stronger at a great distance between the photoelectric cell and the cuvette than at a small distance. By taking two readings with the photoelectric cell of the colorimeter—one with the cuvette placed close to the photoelectric cell and another with the cuvette some distance from the photoelectric cell—it is possible to determine the fat content by a nomographic calculation. The disadvantage to such a method is that it is complicated and does not lend itself to routine analysis.

This invention is based on the discovery of certain phenomena which exist in the relationship between homogenizing pressure and light transmission when the cuvette is placed close to the photoelectric cell. With the relatively short distance between the cuvette and photoelectric cell, it has been found that upon testing a series of milk samples, each of which has been homogenized at a continuously increased homogenizing pressure, there will first be a decrease in light transmission and thereafter an increase. Up until applicant's discovery, those using the colorimetric method for testing fat content of milk had maintained a considerable distance between the cuvette and photoelectric cell whereby the minimum value of the light transmission occurred at a homogenizing pressure so low that it had apparently not been discovered that such a minimum value existed. Also, with this minimum value occurring at such a low homogenizing pressure, it has no practical significance, since at such a low homogenizing pressure the homogenizing obtained is practically negligible.

According to this invention use is made of this minimum light transmission in making colorimetric fat content determination. Accurate fat content measurements may be made with a single testing operation where the reading of the colorimeter is a direct indication of the percentage of fat in the milk sample. For the purpose of this invention, the cuvette is placed at a distance from the colorimeter photoelectric cell such that the curve representing the transmission of light through the cuvette as a function of the homogenizing pressure will show a distinct minimum within the customary homogenizing pressure range. The homogenizing pressure is maintained between 100 kg./cm.$^2$ to 150 kg./cm.$^2$. Preferably, the homogenizing pressure is about 150 kg./cm.$^2$.

By taking light transmission readings at a substantially horizontal portion of the curve representing the light transmission as a function of the homogenizing pressure, substantially greater accuracy can be obtained. The horizontal portion of the curve means that the light transmission is independent of the size of the fat globules. By performing the light transmission measurements, the light transmission is much less dependent on the size of the fat globules than when the measurement is performed at a steeply falling or rising portion of the curve. This holds true provided the size of the fat globules do not vary too greatly. Such a large variation in fat globule size is unlikely since the minimum point of the curve falls within the normal homogenizing pressure range.

As indicated earlier, it is necessary for the cuvette to be placed relatively close to the photoelectric cell for the light transmission readings, in order for the minimum or horizontal portion of the curve representing the light transmission as a function of the homogenizing pressure to fall within the normal homogenizing pressure range. Preferably, the cuvette is placed at a distance from the photoelectric cell equivalent to about 70% of the diameter of the photoelectric cell.

It will be understood that in order to obtain satisfactory results the homogenization pressure must be kept substantially constant. Maintaining a substantially constant homogenizing pressure can be difficult, particularly, when a single-stroke piston pump is being used which gives the liquid a widely varying flow speed. For this reason it is essential that the outlet valve of the homogenizing pump should accurately follow the variations of the speed of flow of the liquid so as to keep the pressure constant at all times and to establish an absolutely sealing closure in the dead position of the pump at the end of each stroke. This can be accomplished by means of a spring-biased ball valve in which the ball abuts a valve seat with a sharp edge which has previously been stamped by means of a stamping ball having the same diameter as the valve ball.

Figure 2:
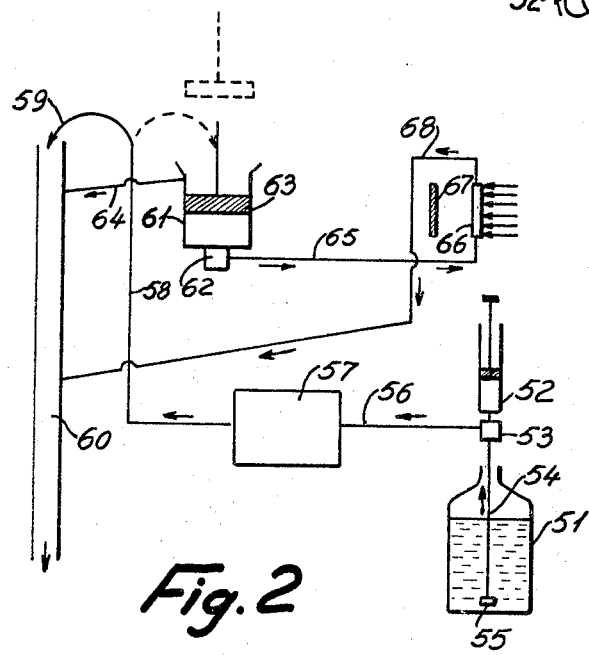
Figure 3:
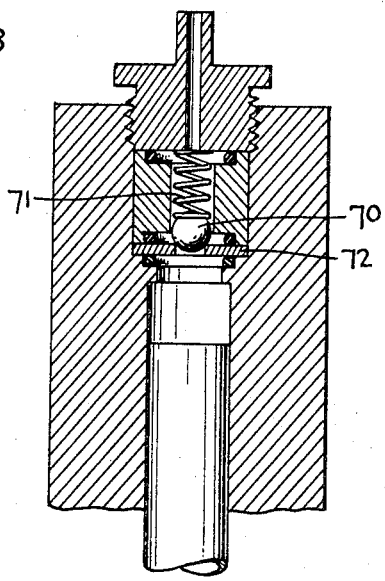
Figure 4:
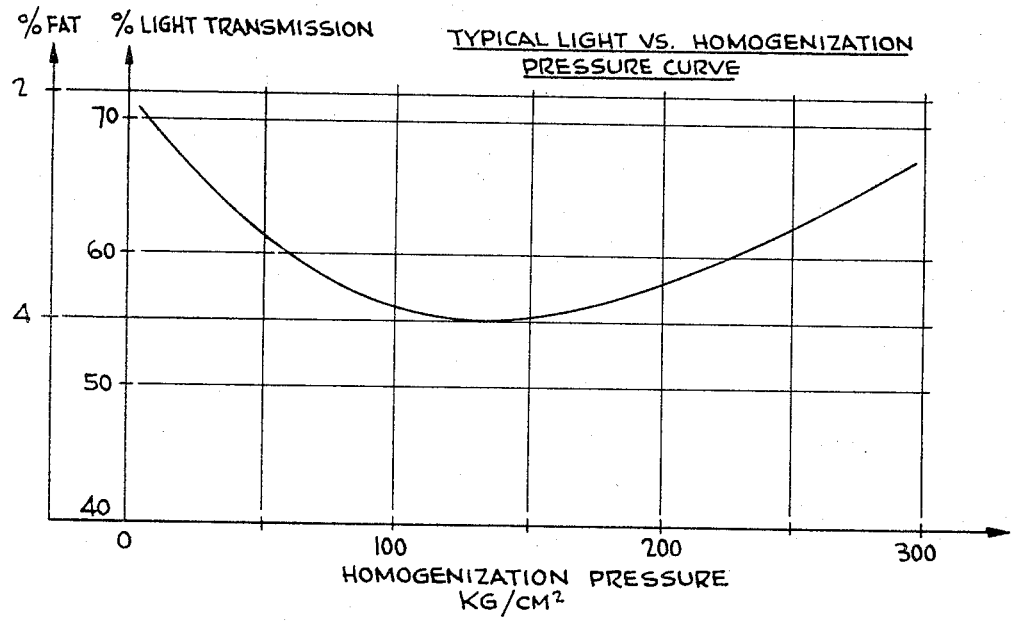

The invention will now be described in further detail with reference to the accompanying drawing in which FIGURE 1 and FIGURE 2 diagrammatically illustrate two different forms of an apparatus which may conveniently be used to perform the method of the present invention. FIGURE 3 shows in cross section a homogenizing valve and FIGURE 4 shows a curve charting the light transmission against the homogenization pressure with the percent fat content correlated to the light transmission.

In FIGURE 1 a filling tube 2 is inserted in a standard test bottle 1 containing the milk to be tested. To prevent impurities in the milk from being drawn with the milk into the homogenizer and thereby clog the valves, the lower end of the filling tube is provided with a filter 3 consisting of a fine mesh wire cloth. The milk is drawn into the apparatus upon operation of the homogenizer pump.

To insure that no air is drawn into the apparatus, the test bottle always contains some milk. Upon the completion of any test, the test bottle is removed from the filling tube and the filling tube is wiped clean prior to placing another sample bottle around the filling tube to prevent contamination.

Milk from the filling tube is drawn through a copper spiral 4 immersed in a thermostatic water bath contained in a vessel 5 sealed by a cover 6.

The water bath is heated by means of an electric heating element 10 controlled by a thermostat 7. The milk should be maintained between 50 and 70° C. during the test. The preferred milk temperature is 60° C. If the temperature is too high, the proteins are destroyed resulting in poor homogenization. Fat globules will tend to clump together if the temperature is too low. To maintain an even temperature throughout the bath, a centrifugal pump 9 driven by an electric motor 8 stirs the water of the thermostat bath. To insure that the homogenizer itself will be maintained at the same temperature as the milk sample, some of the water from the thermostatic bath is circulated from the pump through a rubber hose 40 to copper spiral 41 which surrounds the pump cylinder of the homogenizer. The circulated water is returned to the bath through rubber hose 42. Controlling the temperature of the homogenizer pump insures that the warm milk entering the homogenizer will not be cooled before homogenization by conduction of heat to the metal parts of the homogenizer.

The homogenizer pump itself consists of a pump cylinder 11 with a piston 12 which is operated by a gear motor via cam 43 and connecting rod 44. During the suction stroke of the pump, the milk enters the pump chamber through a suction valve which is simply a conventional ball valve. When the piston is thereafter moved forward to perform the compression stroke, the suction valve is closed whereby the milk is urged through the homogenizing valve, shown in FIGURE 3, into the homogenizing chamber 13 in which the homogenized milk is collected. From the homogenizing chamber the milk thereafter flows to a diluting apparatus described below. The homogenizing valve consists of a valve ball 70 of stainless steel which is urged by a spring 71 towards a valve seat 72 having a sharp edge. Such specially made valve seats are normally stamped by means of a stamping ball having the same diameter as the valve ball.

From the homogenizing chamber 13 the homogenized milk is pressed towards a T-tube 14. One branch of this T-tube is connected to the test tube 15, which to save space, is wound to form a coil, and the other branch of the T-tube is connected to the valve housing of a conventional dispenser 16. The suction hose 17 of the dispenser is connected to a reservoir containing a protein chelating agent and water. The internal diameter of the T-tube 14 must be quite narrow and the length of the tube must be predetermined. For example, a diameter of 0.7 mm. and a length of about 10 mm. may be used. This is to prevent a part of the homogenized milk from being forced into the pipe leading to the dispenser 16. Also, care must be taken that during operation of the dispenser 16 that a part of the aqueous solution delivered thereby is not forced into the tube leading to the homogenizer such that the dispensed volume of liquid would be inaccurate. During homogenization the homogenized milk flows through the test tube 15 to a waste container 18 forcing ahead of it the remainder of the diluted milk from the previous sample. The excess milk is drained through a draining hose. The homogenizer is then stopped, the milk from the sample in the bottle 1 being present in the test tube 15. The volume of the homogenized milk in test tube 15 is known having been calculated from the internal dimensions of the test tube extending from the T-tube to the end of the test tube. This may conveniently be exactly 1 ml.

A spring-biased button 19 is then pressed, displacing the waste container 18 to a point at which a glass funnel 20 mounted in an accentric position in the waste container is located under the end of the test tube. During this movement of the waste container a lever system (not illustrated) depresses a thin vertical rod 22 having a rubber hemisphere 21 on the lower end thereof vertically downward so that the sharp edge of the rubber body is pressed against the conical inner face of the bottom of the funnel to close the latter.

Pressure is then exerted on the button 23 of the dispenser 16 whereby a predetermined quantity of aqueous solution containing the protein chelating agent is sprayed through the test tube and thereby expels the measured amount of homogenized milk which is present in the test tube. Conveniently, for 1 ml. of milk sample the dispenser may be set to issue 8 ml. of aqueous solution; thus 1 ml. of homogenized milk will be diluted with 7 ml. of the aqueous solution in the funnel 20, 1 ml. of aqueous remaining in the test tube.

Since the test tube has a relatively small diameter, the liquid discharged from the discharge end of the test tube, upon operation of dispenser 16, will have a considerable velocity. The liquids from the test tube flow down along the inner face of the funnel whereby a strong turbulence is produced in the funnel substantially in a vertical plane. This results in the liquids mixing thoroughly with each other under the influence of the speed at which the liquids are discharged from the discarge end of the test tube. Installation of a stirring apparatus is thereby avoided. Stirring also might result in inaccuracies owing to adhering liquid drops from the previous test.

Upon completion of the dispensing of the aqueous solution, the button 19 is released so that the waste container 18 with the funnel 20 moves back to the neutral position, i.e. the position illustrated in the draiwng. At the same time, the hemispheric rubber body 21 is lifted opening the bottom of the funnel allowing the liquid mixture in the funnel to flow through plastic hoses 24 and 25 to cuvette 26. The liquid is dispensed from the cuvette through the outlet pipe 27.

The liquid flowing through the cuvette is colorimetrically tested, the colorimeter consisting of a light source 28 which is powered by a stabilized voltage so that the illumination is constant. The light passes through a lense collimator 29 so that a parallel bundle of light is transmitted through the cuvette 26 to a selenium photocell 30 arranged in an interiorly blackened tube 31 at a distance A from the cuvette. The inner wall of the tube must be black so as to avoid reflections of the light. As indicated previously, the distance A between the cuvette and the photocell is preferably about 70% of the diameter D of the photocell in order to obtain the correct optical conditions in the colorimeter so that the test results will be independent of the size of the fat globules in the milk and will depend only on the fat content of the milk as previously described.

The selenium photocell is connected with a highly sensitive galvanometer (not shown). Thus, the amount of light transmitted through the cuvette may be measured as determined by the fat content of the sample being tested. A color filter 32 permitting only light of the wave length $0.6\mu$ to pass (orange light) is arranged between the lense collimator 29 and the cuvette 26.

Light transmission readings for a particular sample are compared with transmission readings taken of samples of known fat content where the homogenization pressure was the same as that for the unknown sample. A typical curve showing light transmission charted against the homogenization pressure is shown in FIGURE 4. The fat content is correlated to the percent light transmission.

The cuvette 26 may preferably consist of two brass rings connected with each other by means of two screws. Each brass ring contains a circular glass plate having a diameter of 20 mm. One of the brass rings is also provided with two pipe stubs, one for supply and one for discharge of the liquid sample. When the cuvette is assembled the distance between the glass plates (the light path) is 0.4 mm. which is suitable for the milk diluted as above described. If the light path were longer, then the operating conditions when testing for the fat content of milk which is about 10% fat would be outside the range of the Lambert-Beer theorem on the logarithmic correlation of light transmission and concentration of fat. If the light path were shorter the sensitivity of the colorimeter would be too small.

It will be observed that the plastic hose 24 conducting the liquid from funnel 20 to the cuvette 26 is longer than absolutely necessary (note the spiral 25). The reason for this is that when mixing the liquids in the funnel solely under the influence of the jet pressure from the test tube, it is impossible to obtain a perfectly homogeneous mixture. It has been found that a small amount of fat and foam collects on the surface of the liquid in the funnel. If this part of the liquid were permitted to enter the cuvette, the light transmission measurements would be in error. To avoid this, the hose 24 has been extended by the portion 25 which contains about 20% of the total volume of the mixed liquid. Thereby the last part of the liquid in the funnel will be retained in the hose so that this liquid portion is kept away from the cuvette until after light transmission measurements have been taken.

The contents of the hose is washed out when the funnel is emptied through the hose in carrying out the next test.

Referring to FIGURE 2, a reservoir container 51 is provided for the water-protein chelating agent solution. From this reservoir the diluting liquid is drawn by means of a dispenser 52 consisting of a spraying pipette with a valve housing 53. From the latter a filling tube 54 extends into container 51, the lower end of the filling tube being provided with a filter 55.

From the valve 53 a conduit 56 extends through a thermostatically controlled block 57 to a vertically disposed pipe 58 which is rotatable about its own axis and provided with a lateral discharge portion 59. Normally, this discharge opens above a drain pipe 60 but may, by operating a handle (not shown), be turned so as to be positioned above a homogenizing cylinder 61 having a homogenizing chamber 62. When the operating handle is released, the pipe 58 is again returned by spring-biasing means to its original position whereby the discharge 59 is located above the drain pipe 60.

Since it is often desirable that this apparatus be portable, it is practical to avoid having a liquid thermostatic bath. This may therefore preferably be constructed in the form of a molded solid block of metal having a high heat-conducting capacity such as silumin. This block may preferably also enclose the homogenizing cylinder 61 and the homogenizing chamber 62, thereby maintaining them at the desired temperature. The silumin block is kept heated by means of electrical elements and the temperature is controlled by means of a thermostat which is received in a bore of the silumin block.

The diluting liquid is heated to the temperature of the silumin block by passing it through a series of conduits in the interior of the silumin block. The diameter and length of the conduits are so selected that the diluting liquid present in the conduits can be heated from about 20° C. (in the reservoir container) to 65° C. in the time interval between two successive tests carried out in the apparatus.

The homogenizing piston 63 is normally located above the cylinder in the position shown in dotted lines. In such position, the cylinder is open so that a predetermined measured quantity of milk may be introduced into the cylinder, e.g. 1 cm.$^3$ Then the discharge tube is swung into position above the homogenizing cylinder, and a measured quantity of the diluting liquid containing the chelating agent is dispensed. The two liquids mix in the cylinder solely by virtue of the velocity of the jet from the discharge 59 of the diluting liquid.

The quantity of diluting liquid dispensed is determined by the quality of milk introduced into the homogenizer, e.g. the quantity of diluting liquid may amount to 7 cm.$^3$ corresponding to 1 cm.$^3$ of milk. Before the diluting liquid leaves the discharge 59, it has been heated by means of the thermostatically controlled heating block 57 to a predetermined temperature which is so selected that by mixing the milk which has not been preheated and the heated diluting liquid the temperature desired for homogenization is obtained. Thus, if the final temperature is to be 60° C. and the proportion of diluting liquid to milk above specified is used, the diluting liquid should be heated to about 65° C. assuming the milk temperature is 20° C. After the milk and the diluting liquid have been mixed in the homogenizing cylinder 61, the piston 63 is moved down to the bottom of the cylinder. Air as may be present under the piston may escape through a venting tube 64 which opens at the top of the side wall of the cylinder. The position of the piston 63 indicated in full lines shows the piston on its way down through the cylinder. The piston may be operated by means of a lever system not shown.

As the piston is moved down to the bottom of the cylinder 61, the measured quantity of mixture of milk and diluting liquid is pressed out through the homogenizing chamber and from the latter through a conduit 65 and through a flow cuvette 66. The mixture may be discharged from the cuvette through conduit 68.

The homogenizing chamber contains a ball valve arranged in the same manner as in the embodiment of FIGURE 1.

The cuvette 66 is mounted in a colorimeter, the photoelectric cell of which is denoted by reference character 67 and which may be similarly constructed as described with reference to FIGURE 1.

After the homogenizing has been carried out the piston is again withdrawn from the cylinder and placed in the position outside the latter, whereafter the inner wall of the cylinder is wiped with a paper tissue to remove residual liquid. The apparatus is then ready for testing the next sample.

It will be understood that certain features may be modified and such modifications are contemplated by and are within the scope of the claims without departing from the spirit of the invention. It is therefore to be understood that the invention is not to be limited to the specific details shown and described.

Having thus described the invention, I claim:

1. A mehod for determining the fat content of milk and related products comprising the steps of preparing a heated, diluted and pressure homogenized aqueous solution of the product to be examined, said product having added thereto a protein chelating agent, the homogenizing being performed at a constant pressure, supplying said solution to a cuvette of a colorimeter having a light source and a photoelectric cell, the distance between said curvette and photoelectric cell being such that a curve representing the transmission of light through the curvette as a function of the homogenizing pressure shows a distinct minimum at said homogenizing pressure, colorimetrically determining the quantity of light transmitted through said cuvette to said photoelectric cell and comparing said quantity of light transmission with further curves representing the transmission of light through the cuvette containing solutions prepared from samples of known fat content and homogenized at said constant pressure to determine the fat content of said milk.

2. A method as claimed in claim 1 wherein the distance between said cuvette and said photoelectric cell is substantially equal to 70% of the diameter of the photoelectric cell.

3. A method as claimed in claim 1 wherein said homogenizing pressure is 100–150 kg./cm.$^2$ 4. A method as claimed in claim 1 wherein the homogenizing pressure is maintained constant by a spring-biased ball valve said ball abutting a valve seat with a sharp edge.

5. A method as claimed in claim 1 wherein said milk is diluted with a solution of water containing a protein chlating agent by passing the homogenized milk through a tube the inlet end of which is connected both to a pump of a homogenizer and to a dispenser containing said solution, said dispenser injectnig a predetermined volume of said solution into said tube after said homogenizer pump has been stopped.

6. A method as claimed in claim 1 wherein said milk product is diluted with a solution of water containing said protein chelating agent before said homogenization the homogenization being performed on the liquid mixture resulting from the dilution.

7. A method as claimed in claim 5 wherein said milk product is heated to a temperature between 50° C. and 70° C. prior to homogenization.

8. A method as claimed in claim 7 wherein said milk product is heated by first heating a solution of said diluting liquid and protein chelating agent before adding said solution to said milk product.

9. An apparatus for carrying out the method according to claim 1 said apparatus comprising means for dispensing the diluting liquid and protein chelating agent, means for heating said diluting agent, means for mixing the product and the diluting liquid, a homogenizer for homogenizing the liquid mixture and a colorimeter having a cuvette and a photoelectric cell for testing the homogenized liquid mixture, the photoelectric cell and cuvette of said colorimeter being spaced from each other at a distance such that a curve representing the passage of light through the cuvette as a function of the homogenizing pressure will shown a distinct minimum at the homogenizing pressure, the homogenizer being capable of adjustment to operate substantially at the homogenizing pressure.

10. An apparatus as claimed in claim 9 wherein the distance between the cuvette and the photoelectric cell is approximately equal to 70% of the diameter of the photoelectric cell.

11. An apparatus as claimed in claim 9 wherein the homogenizer comprises a single-stroke piston pump and an outlet valve said outlet valve comprising a spring-biased valve ball which abuts a valve seat with a sharp edge.

12. An apparatus as claimed in claim 9 further comprising a filling tube provided with a filter at the lower end thereof connected to the inlet to said homogenizer pump said filling tube being adapted to draw a sample of said milk product.

13. An apparatus as claimed in claim 9 further comprising a combined diluting and mixing apparatus consisting of a coiled test tube one end of which is connected to both said homogenizer pump and to a dispenser, said dispenser being capable of ejecting a predetermined volume of said diluting liquid.

14. An apparatus as calimed in claim 13 further comprising a funnel located at a level higher than said cuvette said funnel being connected with said cuvette and having a closure mechanism in the bottom thereof adapted to close the funnel in a liquid tight manner while the milk is being diluted and the liquids are being mixed said closing mechanism being capable of opening the bottom of the funnel after the mixing of the liquid has been completed.

15. An apparatus as claimed in claim 14 further comprising conduit means for carrying said flow from said funnel to said cuvette said conduit means being of sufficient length that about 20% of the milk mixture in the funnel is retained in said conduit means after the flow through the cuvette has ceased.

References Cited
UNITED STATES PATENTS

| | | | |
|---|---|---|---|
| 2,374,427 | 4/1945 | Fear | 99—54 |
| 2,752,815 | 7/1956 | Batchelor | 23—231 XR |
| 3,175,582 | 3/1965 | London | 137—539.5 XR |

MORRIS O. WOLK, *Primary Examiner.*

R. M. REESE, *Assistant Examiner.*

U.S. Cl. X.R.

23—258; 99—54; 137—454.6, 539; 250—218; 356—184